Patented Sept. 15, 1931

1,823,025

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PURIFICATION OF ARYLAMINES

No Drawing.  Application filed February 15, 1929.  Serial No. 340,337.

In the method of making a primary arylamine wherein a mono-halogenated aromatic hydrocarbon is reacted with aqueous ammonia solution at an elevated temperature and pressure and in the presence of a copper compound as catalyst, the resulting reaction product separates upon standing into an aqueous layer containing chiefly ammonia, ammonium chloride and copper salt in solution, and an oily layer consisting chiefly of the primary arylamine product and a lesser amount of the corresponding phenolic compound, together with relatively small amounts of the corresponding secondary amine, diarylether and other compounds. The oil layer also contains traces of water, ammonium salt and copper compounds. Such oil layer is separated from the aqueous layer and treated for the purification of the primary arylamine product. The latter procedure involves numerous practical difficulties, arising principally from the persistency with which the phenolic compound frequently accompanies the primary arylamine through the various purification steps.

For example in the manufacture of aniline by reacting between chlorbenzene and aqueous ammonia solution with a cuprous compound as catalyst, the oil layer so obtained contains, in addition to aniline, from 3 to 8 per cent of phenol, along with smaller amounts of diphenylamine, diphenyl oxide, copper and ammonia compounds. In purifying this product the complete separation of phenol presents considerable difficulty.

The formation of such phenol is unavoidably connected with the aforesaid process, being due to the hydrolytic action of water present. While in practice hydrolysis is largely restrained by providing a large excess of ammoina, nevertheless a certain condition of equilibrium between the reacting components exists, such that a definite modicum of phenol is always produced. A procedure for effecting a substantially quantitative separation of such phenol from the aniline is essential for obtaining a pure water-white product that is permanent and will remain for a long period without material discoloration. To the accomplishment of the foregoing and related ends the invention, then, consists of the steps hereinafter fully described and particularly pointed out in the claims, the following description setting forth in detail certain procedure whereby the principle of the invention may be used.

As previously stated, the reaction mixture derived from the aforementioned process for the manufacture of an arylamine, e. g. aniline, separates upon standing into an aqueous and an oily layer, the former containing excess ammonia, and soluble ammonia and copper compounds together with small amounts of aniline and phenol in solution, while the latter consists of the bulk of the crude aniline product together with unreacted chlorbenzene and organic impurities such as phenol, diphenylamine, diphenyl oxide, etc., as well as traces of ammonia and copper compounds. On boiling the aqueous layer the aniline and phenol content thereof is steamed out, collected by suitable means and added to the oily layer.

The oily layer is treated with dry quick lime, CaO, or a mixture of calcium oxide and hydroxide, to neutralize and fix the phenol as calcium phenate, break up the ammonia compounds and precipitate the copper compounds. Calcium phenate is relatively easily hydrolyzed when heated in the presence of water, reverting thereby more or less completely to phenol. It is, therefore, essential to avoid the presence of water in the succeeding distillation step. Accordingly the proportions of calcium oxide and hydroxide are to be so adjusted that enough oxide is present to combine with all of the water originally in the oily layer, as well as any water formed in the reaction with phenol, as in the equations;

$$CaO + 2C_6H_5OH \rightarrow (C_6H_5O)_2Ca + H_2O$$
$$Ca(OH)_2 + 2C_6H_5OH \rightarrow (C_6H_5O)_2Ca + 2H_2O.$$

In practice a sufficient excess of quick lime is used to insure the substantial absence of water in the resulting mixture. Such mixture is thereupon distilled, conveniently at atmospheric pressure, to drive off any ammonia present.

After treatment with lime as just described the crude aniline is obtained in a substantially anhydrous condition, the phenol content thereof being present as dry calcium phenate, together with whatever excess of lime has been used. The anhydrous mixture is now distilled, preferably under reduced pressure, e. g. about 23 to 27 inches vacuum. The first fraction coming over contains the chlorbenzene, this being returned to the original reaction. Pure aniline then distills over as a clear water-white product. When distillation is completed a heavy, semi-solid residue is left in the still, such residue containing calcium phenate, lime, diphenylamine, diphenyl oxide, copper compounds and tarry decomposition products. The residue is extracted with chlorbenzene or other suitable solvent for recovery of a small amount of residual aniline retained therein. The chlorbenzene extract containing aniline may then be most advantageously utilized by adding same in the charge to a succeeding reaction batch for the formation of a further quantity of aniline. After extraction and separation of residual aniline, water is added to the residue to dissolve the phenate therein and the mixture is filtered to separate the insoluble sludge from the clear solution of calcium phenate. The sludge, containing copper compounds, may be returned to the original reaction for the purpose of supplying a part of the cuprous compound as catalyst therein. The calcium phenate solution may be acidified to liberate phenol, the latter being separated and purified in the usual way.

The efficacy of the foregoing method for purifying the crude aniline product and separating it from the accompanying phenol is believed to lie, at least in large part, in transforming such phenol into a dry calcium phenate, thereby permitting distillation of aniline therefrom substantially without hydrolysis or decomposition of the phenate. The distilled aniline product by this method of purification is obtained in a state of exceptional purity, being much superior to the product heretofore commercially obtainable. Furthermore residual raw materials and by-products are recovered, losses of the values contained therein being almost negligible.

By analogous procedure the crude arylamine product from the reaction between a halogenated aromatic hydrocarbon and aqueous ammonia, generally, with or without the use of a catalyst, may be most advantageously worked up and purified. The herein described method is likewise equally adapted for separating and purifying mixtures of arylamines and phenols, generally, however derived.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of purifying the crude arylamine product of a reaction between a halogenated aromatic hydrocarbon and aqueous ammonia solution, said product also containing a phenolic compound, the steps which consists in treating said crude product with calcium oxide in amount sufficient to convert said phenolic compound to a phenate and to combine with all of the water present, and then distilling said arylamine from the resulting anhydrous mixture.

2. In a method of purifying the crude arylamine product of a reaction between a halogenated aromatic hydrocarbon and aqueous ammonia solution, said product also containing a phenolic compound, the steps which consist in converting said phenolic compound to calcium phenate, adding calcium oxide in amount sufficient to combine with all of the water present, and then distilling said arylamine from the resulting anhydrous mixture.

3. In a method of purifying the crude aniline product of a reaction between chlorbenzene and aqueous ammonia solution, said product also containing phenol, the steps which consist in treating said crude product with calcium oxide in amount sufficient to convert said phenol to a phenate and to combine with all of the water present, and then distilling said aniline from the resulting anhydrous mixture.

4. In a method of purifying the crude aniline product of a reaction between chlorbenzene and aqueous ammonia solution, said product also containing phenol, the steps which consist in converting said phenol to calcium phenate, adding calcium oxide in amount sufficient to combine with all the water present, and then distilling said aniline from the resulting anhydrous mixture.

5. The method of separating an arylamine and a phenol in admixture together which comprises treating the mixture with calcium oxide in amount sufficient to convert said phenol to a phenate and to combine with all of the water formed in such reaction, and then distilling said arylamine from the resulting anhydrous mixture.

6. The method of separating an arylamine and a phenol in admixture together which comprises treating the mixture with calcium hydroxide and calcium oxide in amount sufficient to convert said phenol to a phenate and to combine with all of the water present, and then distilling said arylamine from the resulting anhydrous mixture.

7. The method of separating aniline and phenol in admixture together which comprises treating the mixture with calcium oxide in amount sufficient to convert said phenol to a phenate and to combine with all of the water formed in such reaction, and then distilling said aniline from the resulting anhydrous mixture.

8. The method of separating aniline and phenol in admixture together which comprises treating the mixture with calcium oxide and calcium hydroxide in amount sufficient to convert said phenol to a phenate and to combine with all of the water present, and then distilling said aniline from the resulting anhydrous mixture.

Signed by me this 5th day of February, 1929.

EDGAR C. BRITTON.